United States Patent
Gulati et al.

(10) Patent No.: US 11,076,414 B2
(45) Date of Patent: Jul. 27, 2021

(54) HALF-DUPLEX HANDLING WITH SYSTEM-WIDE FEEDBACK RESOURCES

(71) Applicant: QUALCOMM Incorporated, San Diego, CA (US)

(72) Inventors: Kapil Gulati, Hillsborough, NJ (US); Sudhir Kumar Baghel, Hillsborough, NJ (US); Tien Viet Nguyen, Bridgewater, NJ (US); Arjun Bharadwaj, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/587,976

(22) Filed: Sep. 30, 2019

(65) Prior Publication Data
US 2020/0275463 A1  Aug. 27, 2020

Related U.S. Application Data

(60) Provisional application No. 62/810,159, filed on Feb. 25, 2019.

(51) Int. Cl.
| | | |
|---|---|---|
| H04W 72/12 | (2009.01) | |
| H04L 1/00 | (2006.01) | |
| H04L 1/18 | (2006.01) | |

(52) U.S. Cl.
CPC ........ *H04W 72/1247* (2013.01); *H04L 1/0026* (2013.01); *H04L 1/1819* (2013.01); *H04W 72/1226* (2013.01); *H04W 72/1257* (2013.01)

(58) Field of Classification Search
CPC ............... H04L 1/0026; H04L 1/1819; H04W 72/1226; H04W 72/1247; H04W 72/1257
See application file for complete search history.

(56) References Cited

U.S. PATENT DOCUMENTS

2013/0242815 A1* 9/2013 Wang .................... H04L 1/1854
370/280
2013/0301486 A1* 11/2013 Kishiyama ............ H04L 5/0007
370/277
(Continued)

FOREIGN PATENT DOCUMENTS

WO     2017078465 A1    5/2017

OTHER PUBLICATIONS

Huawei, HiSilicon, "Bandwidth Parts and Resource Pools for V2X sidelink", 3GPP TSG RAN WG1 Meeting #95 Spokane, USA, Nov. 12-16, 2018; R1-1813555 (Year: 2018).*
(Continued)

*Primary Examiner* — Gary Mui
(74) *Attorney, Agent, or Firm* — Patterson & Sheridan, LLP

(57) ABSTRACT

Certain aspects of the present disclosure provide techniques for half-duplex handling with system-wide feedback resources. Embodiments include determining, for a first feedback resource corresponding to a first time period, that the wireless node has a scheduled feedback transmission and a scheduled feedback reception on shared frequency resources. Embodiments include selecting one of the scheduled feedback transmission or the scheduled feedback reception based on a rule. Embodiments include using the feedback resource to perform the selected one of the scheduled feedback transmission or the scheduled feedback reception.

30 Claims, 7 Drawing Sheets

(56) References Cited

U.S. PATENT DOCUMENTS

| | | | |
|---|---|---|---|
| 2015/0029905 A1* | 1/2015 | Yi | H04L 1/0026 370/277 |
| 2016/0157254 A1* | 6/2016 | Novlan | H04W 72/02 370/329 |
| 2016/0219546 A1* | 7/2016 | Ahn | H04L 5/001 |
| 2016/0226629 A1* | 8/2016 | Liu | H04L 1/1861 |
| 2017/0347394 A1 | 11/2017 | Yasukawa et al. | |
| 2018/0007667 A1* | 1/2018 | You | H04L 5/14 |
| 2018/0049219 A1* | 2/2018 | Gupta | H04L 5/0041 |
| 2018/0049220 A1* | 2/2018 | Patil | H04W 72/0426 |
| 2018/0352582 A1* | 12/2018 | Yi | H04W 72/1257 |
| 2019/0053097 A1* | 2/2019 | Rico Alvarino | H04B 7/0626 |
| 2019/0053227 A1* | 2/2019 | Huang | H04W 74/0825 |
| 2019/0166607 A1* | 5/2019 | Zhou | H04L 5/0055 |
| 2019/0190655 A1* | 6/2019 | Pan | H03M 13/356 |
| 2020/0029318 A1* | 1/2020 | Guo | H04W 88/023 |
| 2020/0037343 A1* | 1/2020 | He | H04W 4/40 |
| 2020/0059915 A1* | 2/2020 | Lee | H04W 56/0015 |
| 2020/0099479 A1* | 3/2020 | Park | H04W 4/40 |
| 2020/0106500 A1* | 4/2020 | Noh | H04L 27/2601 |
| 2020/0106564 A1* | 4/2020 | Rungta | H04W 72/0413 |
| 2020/0106566 A1* | 4/2020 | Yeo | H04W 28/04 |
| 2020/0137536 A1* | 4/2020 | Nguyen | H04W 72/005 |
| 2020/0196293 A1* | 6/2020 | Liu | H04W 4/40 |
| 2020/0205165 A1* | 6/2020 | Huang | H04W 72/0453 |
| 2020/0205166 A1* | 6/2020 | Huang | H04W 72/10 |

OTHER PUBLICATIONS

LG Electronics, "Updated feature lead summary for agenda item 7.2.4.1.2 Physical layer procedures"; 3GPP TSG RAN WG1 Meeting #95 Spokane, USA, Nov. 12-16, 2018; R1-1814276 (Year: 2018).*

LG Electronics; "Correction on resource exclusion procedure for V2X Phase 2"; 3GPP TSG RAN WG1 Meeting #95 Spokane, USA, Nov. 12-16, 2018; R1-1814276 (Year: 2018).*

Intel Corporation:"Sidelink physical layer procedures for NR V2X communication", 3GPP Draft;3GPP TSG RAN WG1 Ad-Hoc Meetin 1901, RI-1900481 Intel-EV2X_SL_L1_Procedure,3rd Generation Partnership Project (3GPP),Mobile Competence Centre;650,Route Des Lucioles;F-06921 Sophia-Antipolis Cedex;France vol. RAN WG1,No. Taipei,Taiwan;Jan. 21, 2019-Jan. 25, 2019 Jan. 12, 2019(Jan. 12, 2019),XP051576089, Retrieved from the Internet:URL:http://www.3gpp.org/ftp/tsg%5Fran/WG1%5FRL1/TSGR1%5FAH/NR%5FAH%5F1901/Docs/R1%2D1900481%2Ezip [retrieved on Jan. 12, 2019] p. 5-6.

Intel Corporation:"Physical Layer Procedures for NR V2X Sidelink Design", 3GPP Draft; TSG RAN WG1 RAN1#96, RI-1902482 Intel-EV2X_SL_L1 Procedure, 3rd Generation Partnership Project(3GPP), Mobile Competence Centre; 650, Route Des Lucioles; F-06921 Sophia-Antipolis Cedex ; France vol. RAN WG1, No. Athens,Greece;Mar. 1, 2019-Mar. 20, 2019 Feb. 16, 2019 (Feb. 16, 2019), XP051600178, Retrieved from the Internet: URL:http://www.3gpp.org/ftp/tsg%5Fran/WG1%5FRL1/TSGR1%5F96/Docs/RI%2D1902482%2Ezip [retrieved on Feb. 16, 2019] pp. 3-5,8.

International Search Report and Written Opinion—PCT/US2020/015689—ISA/EPO—dated May 18, 2020.

Intel Corporation: "Resource Allocation Schemes for NR V2X Communication", R1-1902484, 3GPP TSG RAN WG1 Meeting #96, Athens, Greece, Feb. 25-Mar. 1, 2019, pp. 1-17.

* cited by examiner

HALF-DUPLEX HANDLING WITH SYSTEM-WIDE FEEDBACK RESOURCES

CROSS-REFERENCE TO RELATED APPLICATION(S)

This application claims benefit of and priority to U.S. Provisional Patent Application Ser. No. 62/810,159, filed Feb. 25, 2019, herein incorporated by reference in its entirety as if fully set forth below and for all applicable purposes.

BACKGROUND

Field of the Disclosure

Aspects of the present disclosure relate to wireless communications, and more particularly, to techniques for improving half-duplex handling with system-wide feedback resources.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a wireless node. The method generally includes determining, for a first feedback resource corresponding to a first time period, that the wireless node has a scheduled feedback transmission and a scheduled feedback reception on shared frequency resources; selecting one of the scheduled feedback transmission or the scheduled feedback reception based on a rule; and using the feedback resource to perform the selected one of the scheduled feedback transmission or the scheduled feedback reception.

Certain aspects provide an apparatus comprising a memory and a processor coupled to the memory, the memory and processor being configured to: determine, for a first feedback resource corresponding to a first time period, that the wireless node has a scheduled feedback transmission and a scheduled feedback reception on shared frequency resources; select one of the scheduled feedback transmission or the scheduled feedback reception based on a rule; and use the feedback resource to perform the selected one of the scheduled feedback transmission or the scheduled feedback reception.

Certain aspects provide a non-transitory computer readable medium having instructions stored thereon that when executed by a wireless node, cause the wireless node to perform a method for wireless communication. The method generally includes determining, for a first feedback resource corresponding to a first time period, that the wireless node has a scheduled feedback transmission and a scheduled feedback reception on shared frequency resources; selecting one of the scheduled feedback transmission or the scheduled feedback reception based on a rule; and using the feedback resource to perform the selected one of the scheduled feedback transmission or the scheduled feedback reception.

Certain aspects provide an apparatus for wireless communications. The apparatus generally includes means for determining, for a first feedback resource corresponding to a first time period, that the apparatus has a scheduled feedback transmission and a scheduled feedback reception on shared frequency resources; means for selecting one of the scheduled feedback transmission or the scheduled feedback reception based on a rule; and means for using the feedback resource to perform the selected one of the scheduled feedback transmission or the scheduled feedback reception.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
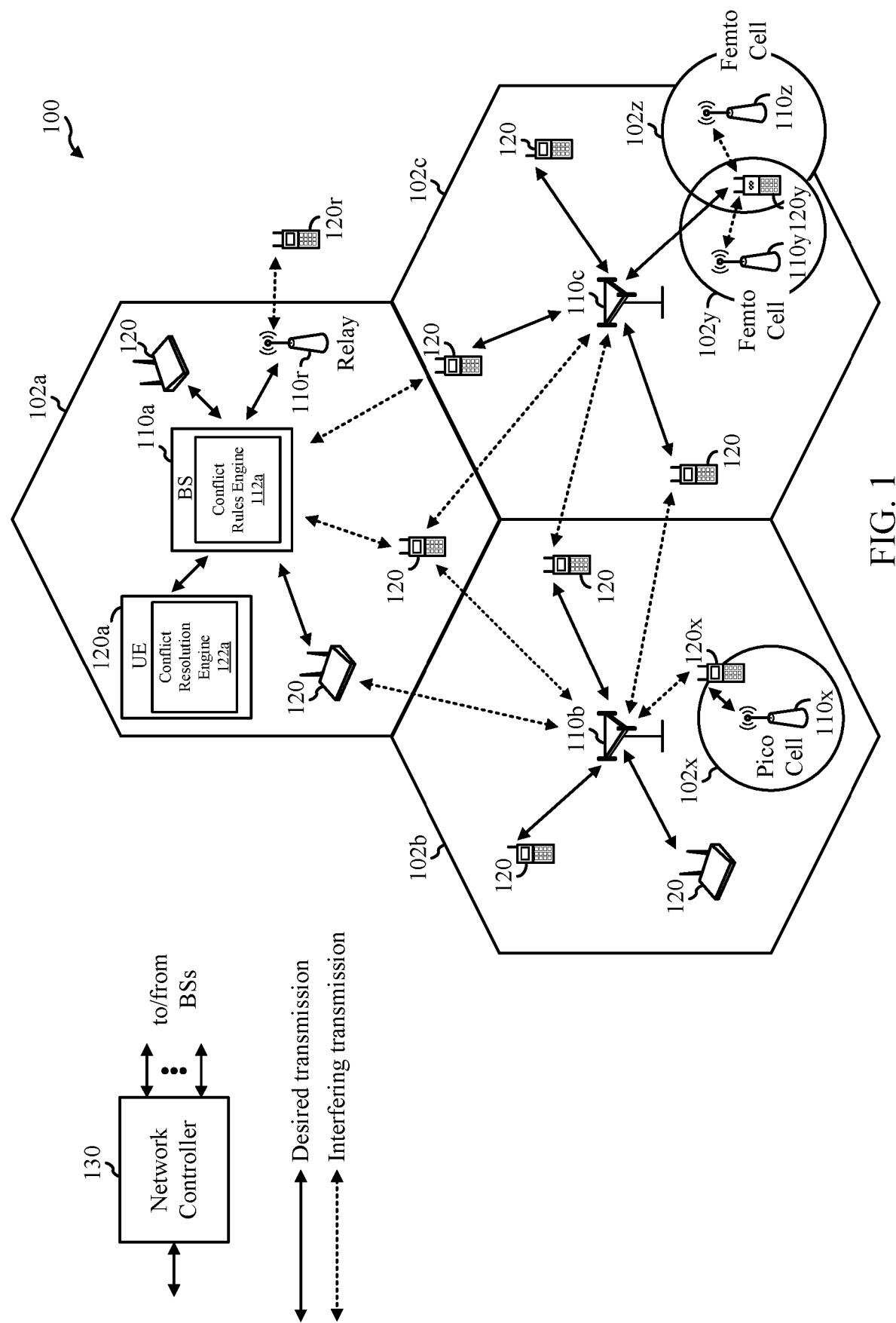
FIG. 1 is a block diagram conceptually illustrating an example telecommunications system, in accordance with certain aspects of the present disclosure.

Aspects of the present disclosure provide apparatus, methods, processing systems, and computer readable mediums for half-duplex handling with system-wide resources.

Certain wireless communication systems described herein may involve half-duplex techniques, in which a communication system is enabled both to receive and to transmit radio signals but not at the same time. In some cases, half-duplex communication systems may use hybrid automatic repeat request (HARQ) signaling. In HARQ, redundant bits are added to transmitted data in a message using an error-detecting (ED) code and the data is encoded using a forward error correction (FEC) code. Parity bits may be sent along with the data, or transmitted separately if a receiver detects an error with the received message. Receivers of a HARQ message determine if the received data is corrupted based on the HARQ message and request anew message if the data is corrupted. In some embodiments, a receiver responds to a HARQ message with either an acknowledgment (ACK) or negative acknowledgment (NACK). In response to a NACK, the transmitting device may send a HARQ retransmission. In some cases, channel state information (CSI) signaling is also sent and received by half-duplex communication systems, such as in conjunction with or separately from HARQ signaling.

Half-duplex communication systems may use system-wide feedback resources to transmit and receive HARQ and CSI signaling. There may be temporal conflicts where a scheduled transmission of HARQ or CSI feedback and a scheduled reception of HARQ or CSI feedback overlap in time. However, because half-duplex systems are unable to transmit and receive at the same time, the temporal conflicts may need to be resolved by selecting only one of the scheduled transmission or the scheduled reception of HARQ or CSI feedback to perform using a given system-wide resource.

Techniques described herein involve applying rules for resolving temporal conflicts between scheduled feedback transmissions and scheduled feedback receptions. For example, a rule may indicate that when a scheduled feedback transmission and a scheduled feedback reception overlap in time, then the scheduled feedback reception should be selected rather than the scheduled feedback transmission (or vice versa). In some embodiments, rules may be based on priorities determined using quality of service (QoS) information associated with packets to which scheduled feedback transmissions and receptions correspond, and/or etc. In certain embodiments, rules may be based on types of feedback signaling, such as selecting HARQ signaling over CSI signaling. Various techniques for resolving conflicts between scheduled feedback transmissions and scheduled feedback receptions are discussed in particular with respect to FIGS. 5 and 6 below.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3 GPP2).

New Radio (NR) is an emerging wireless communications technology under development in conjunction with the 5G Technology Forum (SGTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, UEs 120 and network entities (such as BSs 110) may be configured for half-duplex handling with system-wide feedback resources using techniques described herein with reference to FIGS. 4-6, respectively. In certain embodiments, one or more UEs 120 may employ techniques described herein to resolve temporal conflicts for use of system-wide feedback resources between scheduled feedback transmissions and scheduled feedback receptions that overlap in time. As an example, UE 120a comprises conflict resolution engine 122a, which generally performs operations related to resolving temporal conflicts for use of system-wide feedback resources between scheduled feedback transmissions and scheduled feedback receptions that overlap in time, as described herein. As another example, BS 110a comprises conflict rules engine 112a, which generally performs operations described herein related to providing rules for resolving temporal conflicts for use of system-wide feedback resources between scheduled feedback transmissions and scheduled feedback receptions that overlap in time, as described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
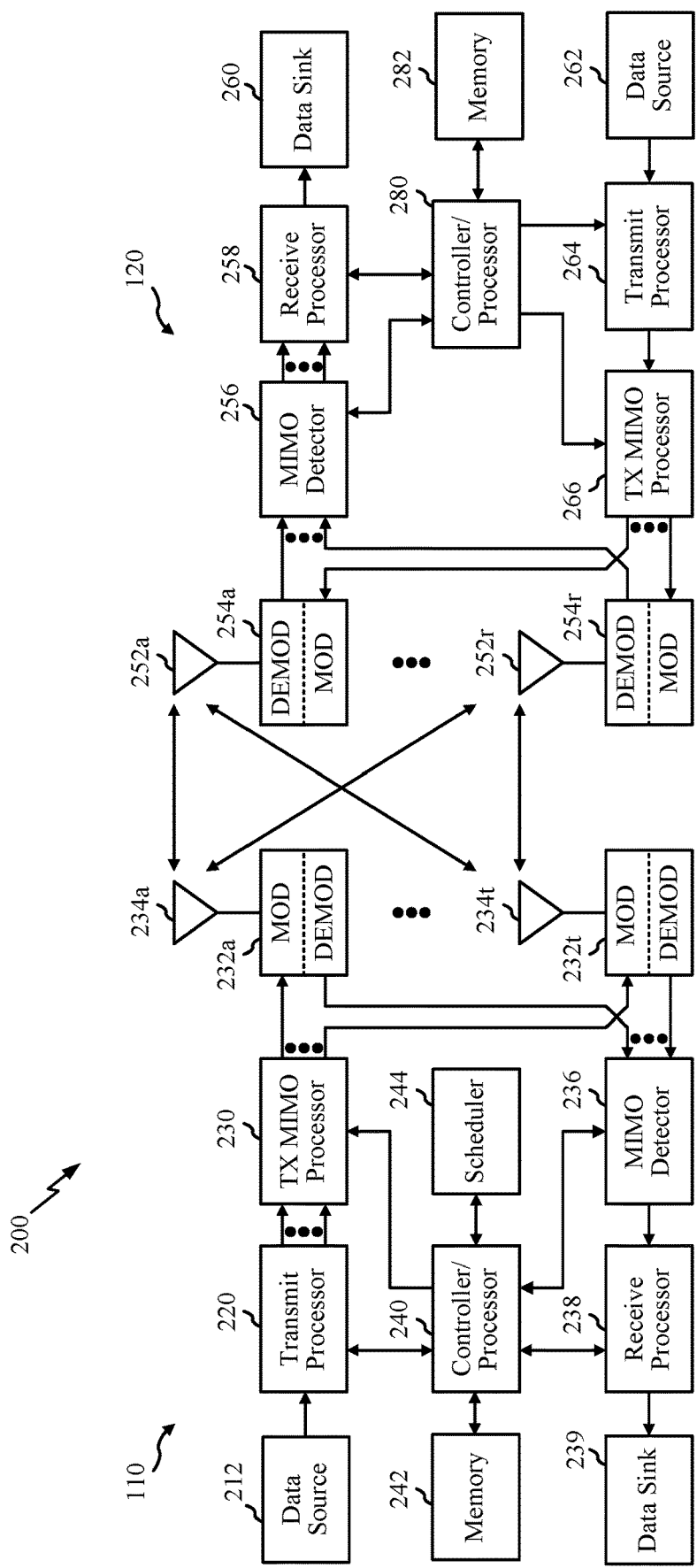
FIG. 2 is a block diagram conceptually illustrating a design of an example base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 1, the controller/processor 240 of the BS 110 has a conflict rules engine that may be configured for performing operations related to providing rules for resolving temporal conflicts for use of system-wide feedback resources between scheduled feedback transmissions and scheduled feedback receptions that overlap in time, according to aspects described herein. For example, as shown in FIG. 1, the controller/processor 280 of the UE 120 has a conflict resolution engine that may be configured for performing operations related to resolving temporal conflicts for use of system-wide feedback resources between scheduled feedback transmissions and scheduled feedback receptions that overlap in time, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
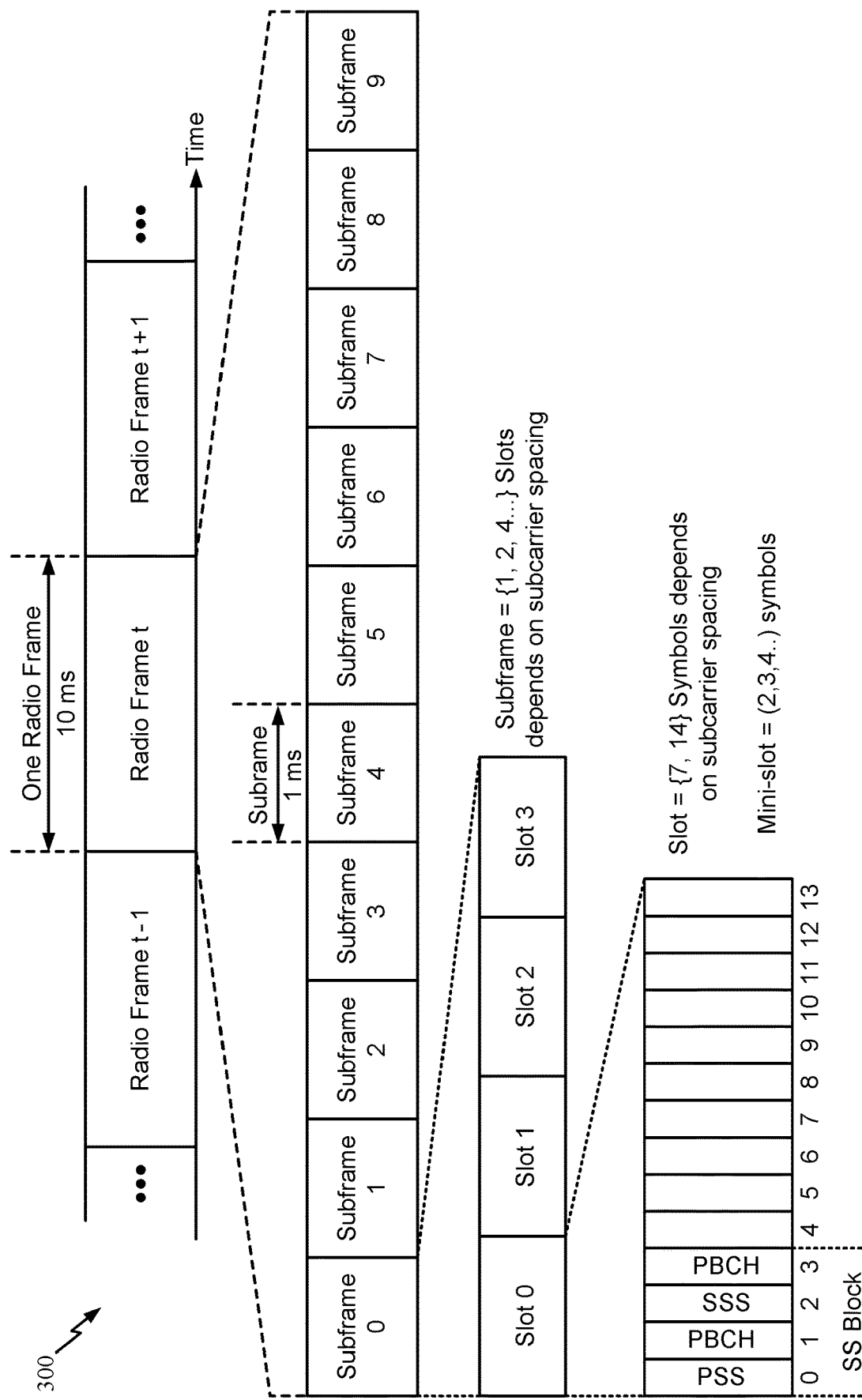
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, vehicle-to-everything (V2x) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Enhancements for Half-Duplex Communication Systems with System-Wide Feedback Resources In certain communication systems in which receive and transmit frequency bands are close to one another, half-duplex reception and transmission schemes have been utilized with a gap in time (which may sometimes be referred to as a guard period, guard interval, and/or various other suitable terms) between a reception and a transmission at a wireless node (e.g., UE or BS) to avoid interference between the receive and transmit signals. A half-duplex transceiver, for instance, may be implemented both to receive and to transmit radio signals but not at the same time. In one example, a vehicle-to-everything (V2X) communication system may comprise a half-duplex transceiver, such as in a user equipment (e.g., UE 120 of FIG. 1), that receives forward link (FL) signals from another wireless node, such as a different UE, and transmits return link (RL) signals to the wireless node in designated time slots or subframes of a given half-duplex (HD) frame, with a specific gap between the subframe for the FL and the subframe for the RL. Other time periods than subframes and slots may be used in some aspects.

In a half-duplex system, a large amount of guard time is typically provided to ensure sufficient separation of time between a reception and a transmission. Because no information-carrying signal can be received or transmitted during the guard time, a large amount of guard time in each HD frame results in wasted overhead and inefficiency.

A half-duplex communication system may support hybrid automatic repeat request (HARQ) signaling. In ARQ, redundant bits are added to transmitted data in a message using an error-detecting (ED) code such as a cyclic redundancy check (CRC). Receivers of the message determine if the received data is corrupted based on the ED code and request a new message if the data is corrupted. In HARQ, the data is encoded using a forward error correction (FEC) code, and parity bits are sent along with the data, or transmitted separately if a receiver detects an error with the received message. HARQ signaling may include an acknowledgment (ACK) or negative acknowledgment (NACK). Packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

In some cases, channel state information (CSI) signaling is also sent and received by half-duplex communication systems. CSI generally refers to known channel properties of a communication link. This information describes how a signal propagates from the transmitter to the receiver and represents the combined effect of, for example, scattering, fading, and power decay with distance. For example, HARQ may be supported for sidelink groupcast signaling while CSI and HARQ signaling may both be supported for sidelink unicast signaling. In certain cases, CSI and HARQ signaling are both performed using feedback resources allocated to a UE, such as periodically. In certain embodiments, to avoid wasted resources, system-wide feedback resources can be used.

System-wide feedback resources (e.g., time and frequency resources, such as a particular time resource periodically across the frequency used for half-duplex communications) may generally be used for either transmission or reception of feedback signaling, such as HARQ and CSI signaling, and may be used as they become available at periodic instances. System-wide feedback resources for a UE may be configured with a certain periodicity, and during each defined period a given system-wide feedback resource may be used by the UE for transmission of feedback (e.g., HARQ or CSI) for all transmissions received by the UE within a certain number of slots prior to the occurrence of the given system-wide feedback resource. A number of symbols of a system-wide feedback resource may also be configurable. However, in half-duplex communication systems, a UE cannot both transmit and receive simultaneously. As such, if a UE has both a transmission and a reception of feedback expected when a single system-wide feedback resource becomes available, the UE may need to choose between performing the transmission or the reception. Accordingly, techniques described herein involve various methods of resolving a temporal conflict between a feedback transmission and a feedback reception.

Figure 4:
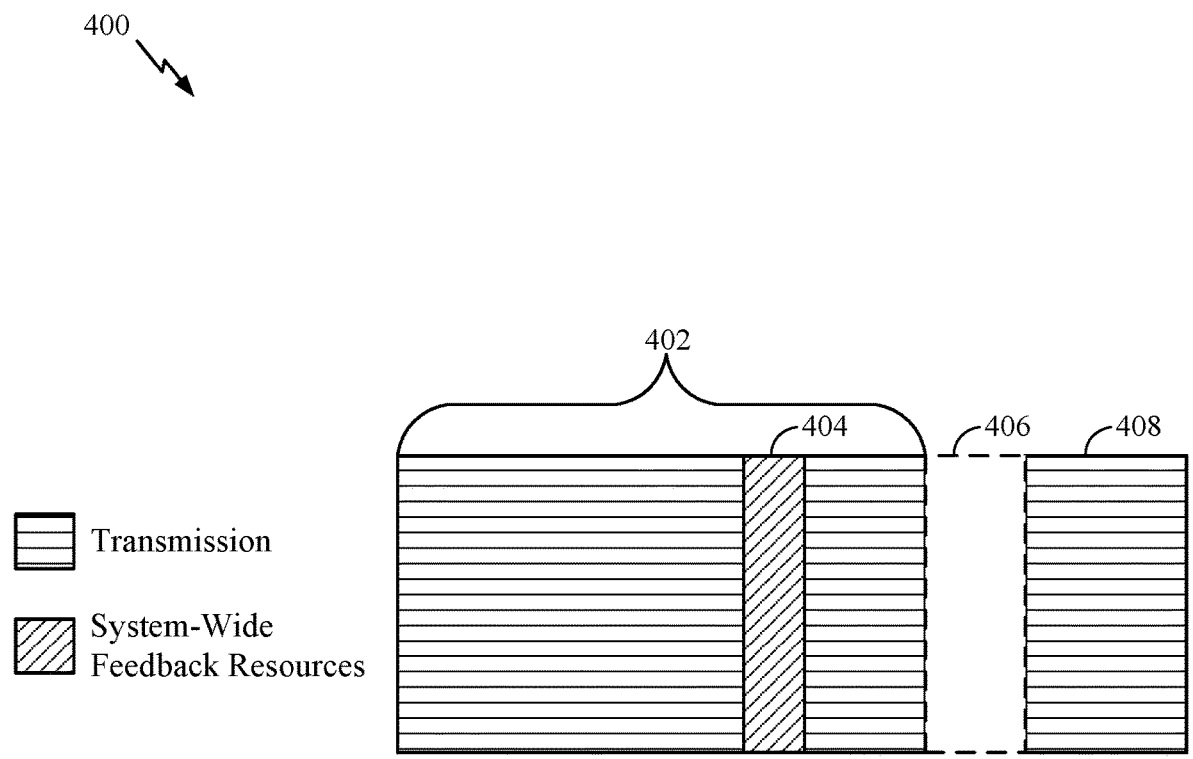
FIG. 4 illustrates an example of an occurrence of a system-wide feedback resource according to embodiments of the present disclosure.

FIG. 4 illustrates an example 400 of an occurrence of a system-wide feedback resource during which a feedback transmission and a feedback reception may both be scheduled according to embodiments of the present disclosure. Example 400 may, for instance represent an occurrence of a system-wide feedback resource for use by a UE, such as UE 120 of FIG. 1. In the illustrated example, time is shown horizontally, while frequency is indicated vertically.

In example 400, transmissions are performed during frames 402 and 408, which are separated by a gap 406. A system-wide feedback resource is provided during a subframe 404 of frame 402. Subframe 404 may represent the occurrence of a periodically allocated system-wide feedback resource. For example, frame 402 may be representative of Radio Frame t of FIG. 3 and subframe 404 may be representative of Subframe 4 of FIG. 3.

In one example, subframe 404 includes one or more symbols before and/or after a system-wide feedback resource that are punctured during an ongoing transmission in frame 402 at the UE. Puncturing generally refers to a technique where an ongoing transmission is interrupted to perform a time-sensitive transmission or reception of signaling. One or more symbols (e.g., two symbols) of physical sidelink feedback channel (PSFCH) may be used during subframe 404 as the system-wide feedback resource. In general, system-wide feedback resources for HARQ and CSI can be either time division multiplexed (TDM) or frequency division multiplexed (FDM) and may have different configuration signaling (e.g., RRC signaling) accordingly. Even the periodicities of system-wide feedback resources for HARQ and CSI may be different. For example, one slot may include system-wide feedback resources only for HARQ and another slot may include system-wide feedback resources for CSI and HARQ.

It is noted that regardless of the periodicity of a system-wide feedback resource, the UE may not use every occurrence of a system-wide feedback resource. For example, the UE may use a system-wide feedback resource on every second or third periodic occurrence based on capabilities of the UE and/or based on a QoS level of the UE, such as based on priority and/or latency requirement. For example, the UE may use fewer system-wide feedback resources in order to reduce latency in transmission/reception of other data.

In one example, both a feedback transmission and a feedback reception are scheduled for the UE during subframe 404. For example, the UE may have received a transmission prior to subframe 404 which it is to respond to with a feedback transmission (e.g., via HARQ and/or CSI signaling) and may have also sent a transmission prior to subframe 404 for which it expects to receive feedback from a recipient (e.g., via HARQ and/or CSI signaling). In certain embodiments, the UE is a half-duplex communication system and cannot simultaneously transmit and receive. As such, the UE must determine which of the feedback transmission and the feedback reception to perform during subframe 404.

Resolving conflicts between feedback transmissions and feedback receptions is described in more detail below with respect to FIG. 5.

Figure 5:
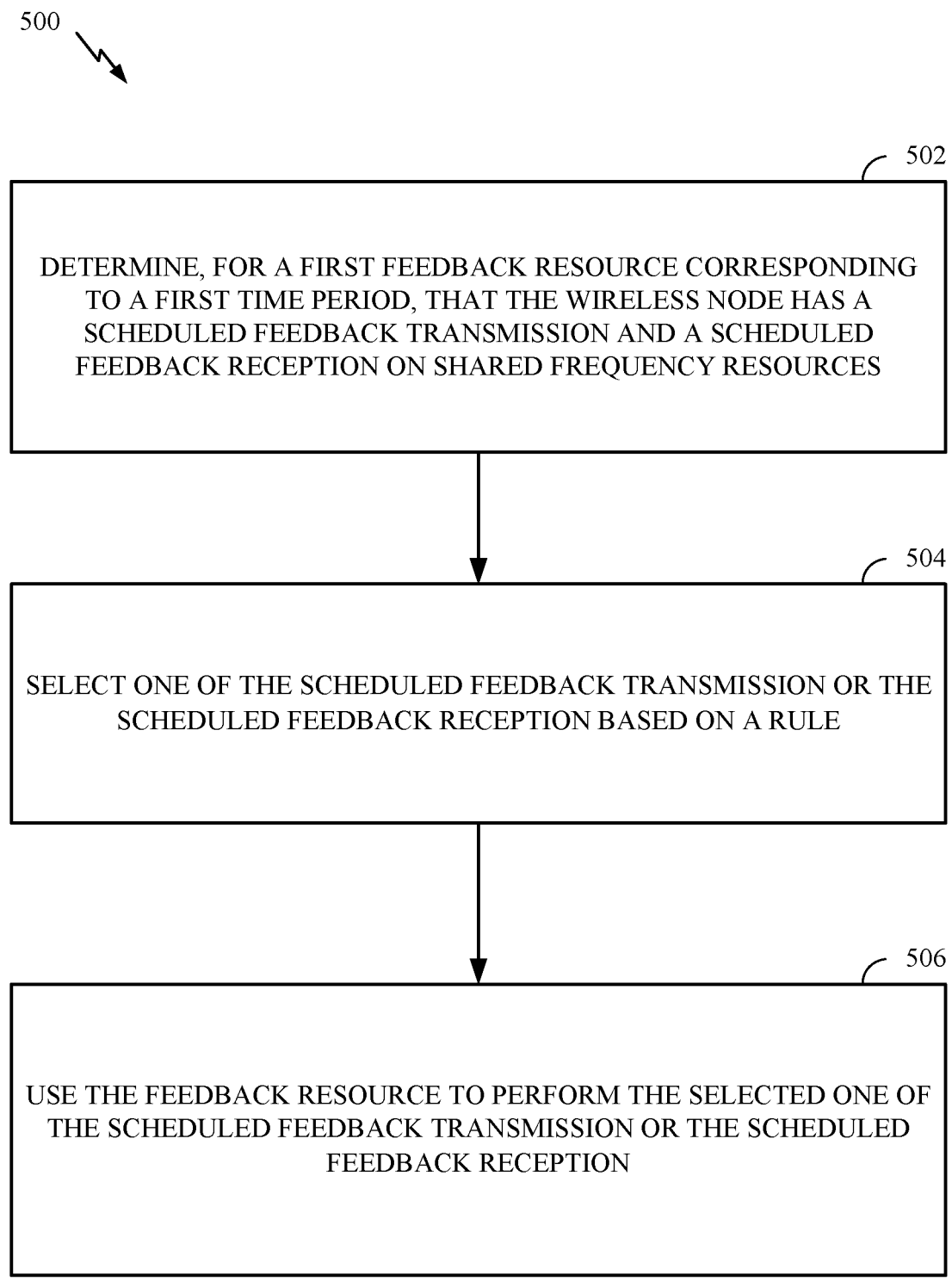
FIG. 5 illustrates example operations for wireless communications by a wireless node, in accordance with certain aspects of the present disclosure.

Example Operations Related to Half-Duplex
Handling with System-Wide Feedback Resources FIG. 5 depicts example operations 500 related to wireless communication by a wireless node such as a user equipment (UE), in accordance with certain aspects of the present disclosure. For example, operations 500 may be performed by UE 120 of FIG. 1.

At 502, it is determined, for a first feedback resource corresponding to a first time period, that the wireless node has a scheduled feedback transmission and a scheduled feedback reception on shared frequency resources. For example, the wireless node may have previously received a transmission for which the scheduled feedback transmission is a response and may have previously sent a transmission for which the scheduled feedback reception is expected in response from another wireless node. The scheduled feedback transmission and the scheduled feedback reception may, for example, include HARQ and/or CSI signaling.

At 504, one of the scheduled feedback transmission or the scheduled feedback reception is selected based on a rule. For example, one or more rules may be defined for the resolution of temporal conflicts between feedback transmissions and feedback receptions. The one or more rules may be provided to the wireless node, from another wireless node, such as a base station (BS) 110 of FIG. 1 or a different UE 120 of FIG. 1, such as via radio resource control (RRC) signaling. In other embodiments, the one or more rules are defined at the wireless node.

In some embodiments, a rule may indicate that feedback receptions should be selected over feedback transmissions when they are scheduled during the same time period. This may be beneficial because the wireless node may have previously sent a multicast transmission to a plurality of recipient wireless nodes, and the scheduled feedback reception may include expected feedback from each of the plurality of recipient wireless nodes. By contrast, the scheduled feedback transmission may be directed to a single wireless node from which a transmission was previously received. Therefore, prioritizing feedback reception over feedback transmission may be more efficient.

In certain embodiments, a rule may indicate that the selection between a feedback transmission and a feedback reception should be made based on priorities. For example, the rule may indicate that the wireless node should determine which of the feedback transmission or the feedback reception has a higher priority, such as based on quality of service (QoS) information. In one example, QoS information is received by the wireless node with a packet to which the scheduled transmission is a response. Furthermore, QoS information may be associated with a packet which the wireless node sent and to which the scheduled feedback reception is a response. QoS information may specify certain values related to a given packet, such as a priority and a latency requirement for the given packet, and one or more of these values may be used to determine a priority for a feedback transmission or reception associated with the given packet. The rule may, for example, indicate that the wireless node should select between a feedback transmission and a feedback reception based on which has the higher priority. In certain aspects, QoS information is included in the packet. In certain aspects, QoS information is communicated separately from the packet. In certain aspects, a UE is configured with QoS for a given bearer used for communication, and the QoS for packets on the bearer is the QoS of the bearer.

In some embodiments, a rule may indicate that if a feedback transmission and a feedback reception have the same priority, then an additional rule should be applied. For instance, the additional rule may be configured for the wireless node, such as via RRC signaling from another wireless node. The additional rule may indicate that a feedback transmission should be selected over a feedback reception if they have equal priorities. Alternatively, the additional rule may indicate that a feedback reception should be selected over a feedback transmission if they have equal priorities.

In certain embodiments, a rule may indicate that that the selection between a feedback transmission and a feedback reception should be made based on types of feedback. For example, HARQ feedback may be selected over CSI or vice versa. In one example, a rule indicates that a feedback transmission should be selected over a feedback reception if the feedback transmission comprises HARQ signaling and the feedback reception comprises CSI signaling. Likewise, the rule may indicate that a feedback reception should be selected over a feedback transmission if the feedback reception comprises HARQ signaling and the feedback transmission comprises CSI signaling. In some embodiments, groupcast or multicast signaling may be selected over unicast signaling or vice versa. In one example, a rule indicates that a feedback transmission should be selected over a feedback reception if the feedback transmission comprises groupcast signaling and the feedback reception comprises unicast signaling. Likewise, the rule may indicate that a feedback reception should be selected over a feedback transmission if the feedback reception comprises groupcast signaling and the feedback transmission comprises unicast signaling. In certain aspects, the rule indicating that that the selection between a feedback transmission and a feedback reception should be made based on types of feedback, may be used in conjunction with one or more of the other rules discussed.

It is noted that these rules are only included as examples, and other rules and/or combinations of rules for selecting between feedback transmissions and feedback receptions are possible.

At 506, the feedback resource is used to perform the selected one of the scheduled feedback transmission or the scheduled feedback reception. For example, if the scheduled feedback transmission is selected, then the scheduled feedback transmission may be sent using the system-wide feedback resource by the wireless node. Likewise, if the scheduled feedback reception is selected, then the scheduled feedback reception may be performed using the system-wide feedback resource, such as by receiving at the wireless node feedback signaling from one or more wireless nodes.

Figure 6:
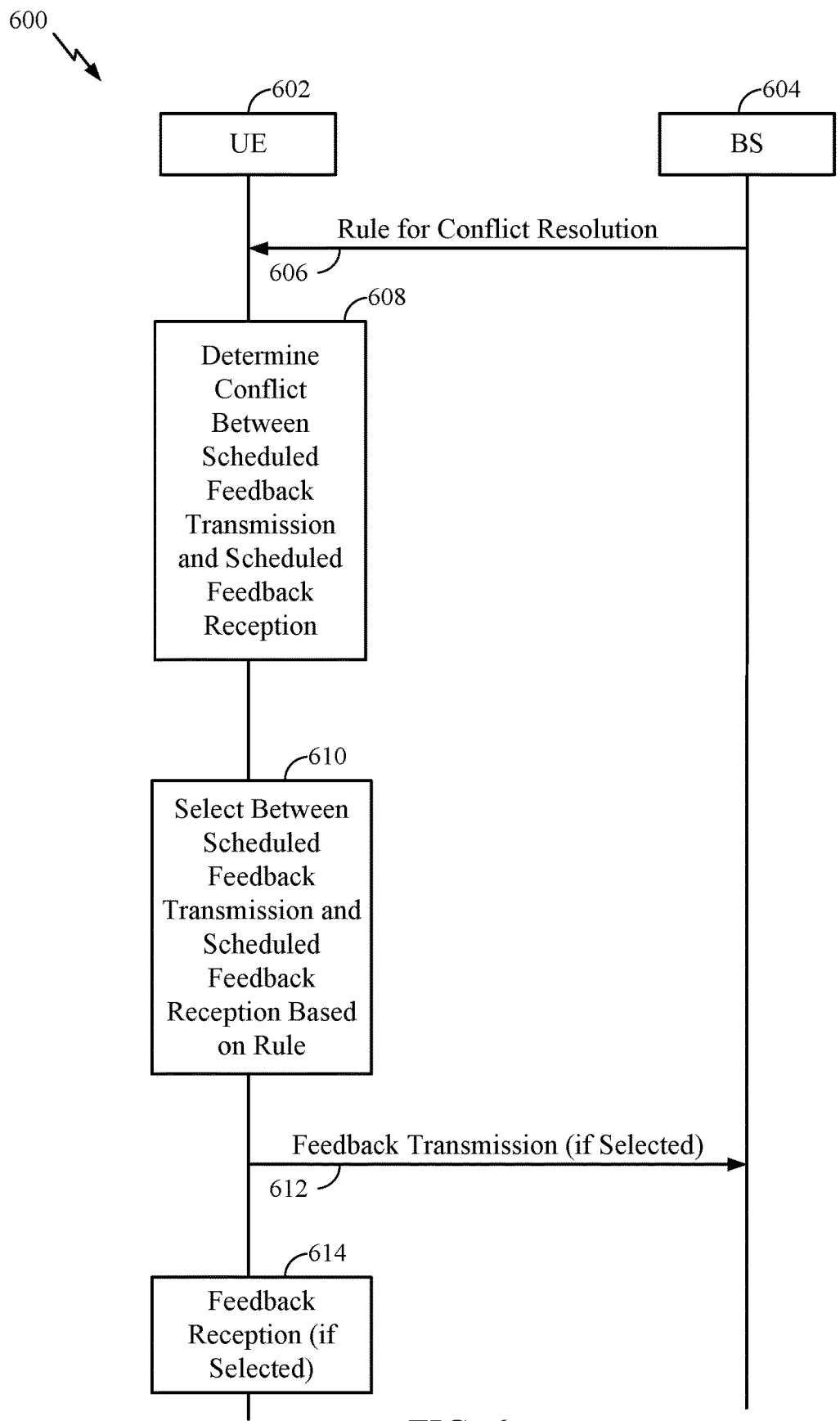
FIG. 6 illustrates an example call flow diagram for wireless communications by a wireless node, in accordance with certain aspects of the present disclosure.

FIG. 6 illustrates an example call flow diagram 600 for wireless communications between a user equipment (UE) 602 and a base station (BS) 604, in accordance with certain aspects of the present disclosure. UE 602 is generally representative of any of UEs 120 of FIG. 1 and BS 604 is generally representative of any of BSs 110 of FIG. 1.

At 606, BS 604 sends a rule for conflict resolution to UE 602. The rule generally specifies how to resolve a temporal conflict between a scheduled feedback transmission and a scheduled feedback reception that overlap in time. It is noted that in other embodiments the rule may be provided to UE 602 by another UE 120 of FIG. 1.

AT 608, UE 602 determines a temporal conflict for shared frequency resources between a scheduled feedback transmission and a scheduled feedback reception that overlap in time.

At 610, UE 602 selects between the scheduled feedback transmission and the scheduled feedback reception based on the rule. In an example, UE 602 applies the rule received at 606 in order to perform the selection.

At 612, if the scheduled feedback transmission was selected at 610, the scheduled feedback transmission is performed using the shared frequency resources. While the transmission is depicted between UE 602 and BS 604, it is noted that the transmission may alternatively be performed between UE 602 and another UE 120 of FIG. 1.

At 614, if the scheduled feedback reception was selected at 610, the scheduled feedback reception is performed using the shared frequency resources. For example, UE 604 may receive the feedback from another UE 120 of FIG. 1 or from BS 604.

Figure 7:
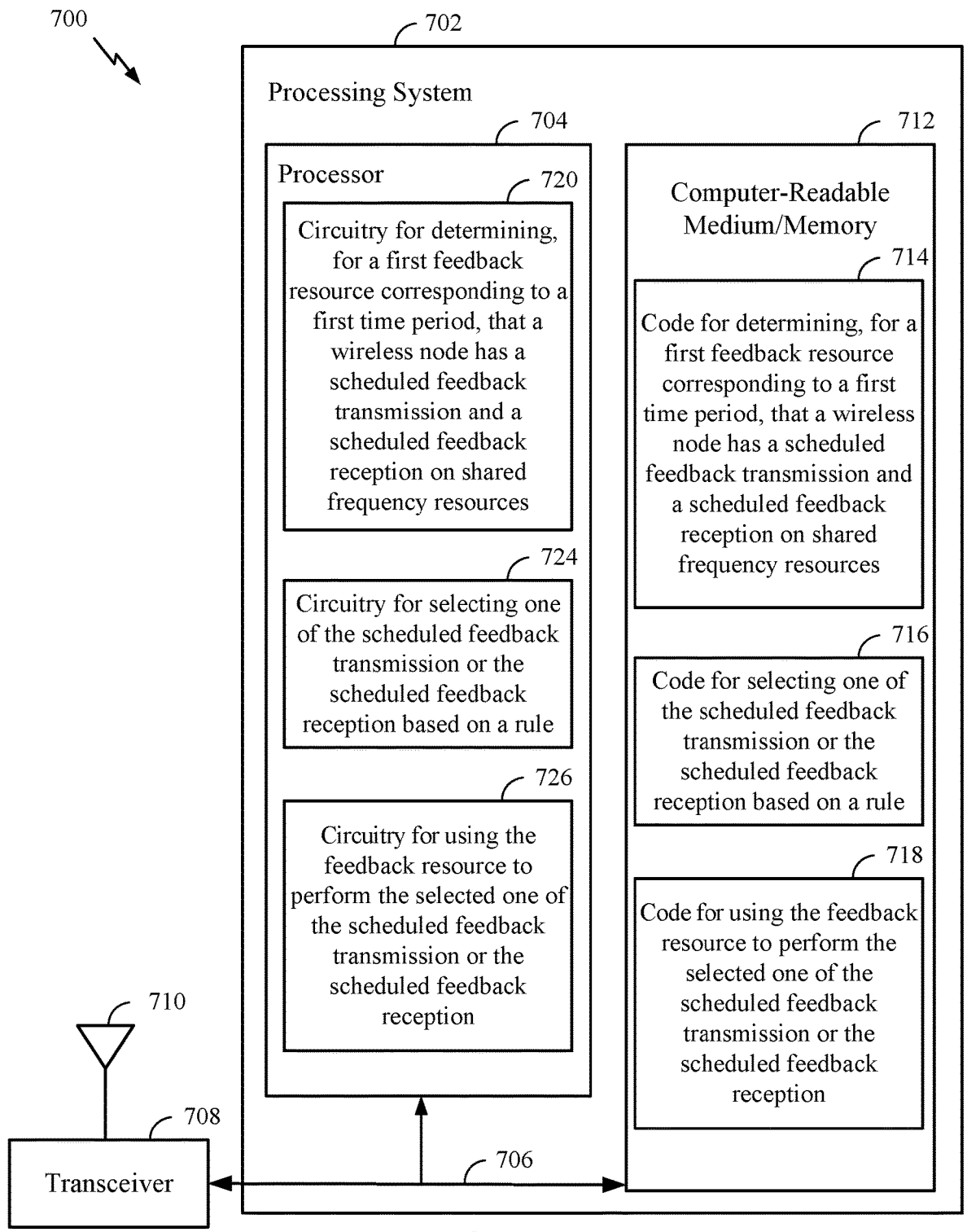
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for resolving temporal conflicts for use of system-wide feedback resources between scheduled feedback transmissions and scheduled feedback receptions that overlap in time. In certain aspects, computer-readable medium/memory 712 stores code 714 for determining, for a first feedback resource corresponding to a first time period, that a wireless node has a scheduled feedback transmission and a scheduled feedback reception on shared frequency resources; code 716 for selecting one of the scheduled feedback transmission or the scheduled feedback reception based on a rule; and code 718 for using the feedback resource to perform the selected one of the scheduled feedback transmission or the scheduled feedback reception. In certain aspects, the processor 704 has circuitry configured to implement the code stored in the computer-readable medium/memory 712. The processor 704 includes circuitry 720 for determining, for a first feedback resource corresponding to a first time period, that a wireless node has a scheduled feedback transmission and a scheduled feedback reception on shared frequency resources; circuitry 724 for selecting one of the scheduled feedback transmission or the scheduled feedback reception based on a rule; and circuitry 726 for using the feedback resource to perform the selected one of the scheduled feedback transmission or the scheduled feedback reception.

EXAMPLE EMBODIMENTS

Embodiment 1

A method for wireless communication at a wireless node, the method comprising: determining, for a first feedback resource corresponding to a first time period, that the wireless node has a scheduled feedback transmission and a scheduled feedback reception on shared frequency resources; selecting one of the scheduled feedback transmission or the scheduled feedback reception based on a rule; and using the feedback resource to perform the selected one of the scheduled feedback transmission or the scheduled feedback reception.

Embodiment 2

The method of Embodiment 1, wherein the scheduled feedback transmission and the scheduled feedback reception each comprises either hybrid automatic repeat request (HARQ) signaling or channel state information (CSI) signaling.

Embodiment 3

The method of Embodiment 1, wherein the rule indicates that the scheduled feedback reception should be selected over the scheduled feedback transmission when scheduled during a same time period.

Embodiment 4

The method of Embodiment 1, wherein the rule indicates to: determine a first priority of the scheduled feedback reception; determine a second priority of the scheduled feedback transmission; and select the one of the scheduled feedback transmission or the scheduled feedback reception based on the first priority and the second priority.

Embodiment 5

The method of Embodiment 4, wherein the rule indicates to select the scheduled feedback reception when the first priority is greater than the second priority, and wherein the rule indicates to select the scheduled feedback transmission when the second priority is greater than the first priority.

Embodiment 6

The method of Embodiment 4, wherein the rule indicates, when the second priority is equal to the first priority, to select between the scheduled feedback transmission and the scheduled feedback reception based on signaling provided to the wireless node.

Embodiment 7

The method of Embodiment 6, wherein the signaling provided to the wireless node indicates to select the scheduled feedback transmission when the second priority is equal to the first priority.

Embodiment 8

The method of Embodiment 6, wherein the signaling provided to the wireless node indicates to select the scheduled feedback reception when the second priority is equal to the first priority.

Embodiment 9

The method of Embodiment 4, wherein the first priority is based on a quality of service (QoS) associated with a packet associated with the scheduled feedback reception, and wherein the second priority is based on a QoS associated with a packet associated with the scheduled feedback transmission.

Embodiment 10

The method of Embodiment 1, wherein the rule indicates that the scheduled feedback reception should be selected over the scheduled feedback transmission if the scheduled feedback reception comprises hybrid automatic repeat request (HARQ) signaling and the scheduled feedback transmission comprises channel state information (CSI) signaling.

Embodiment 11

The method of Embodiment 1, wherein the rule indicates that the scheduled feedback transmission should be selected over the scheduled feedback reception if the scheduled feedback transmission comprises hybrid automatic repeat request (HARQ) signaling and the scheduled feedback reception comprises channel state information (CSI) signaling.

Embodiment 12

The method of Embodiment 1, wherein the rule indicates that the scheduled feedback transmission should be selected over the scheduled feedback reception if the scheduled feedback transmission comprises groupcast signaling and the scheduled feedback reception comprises unicast signaling.

Embodiment 13

An apparatus comprising: a memory; and a processor configured to perform a method for wireless communication at a wireless node, the method comprising: determining, for a first feedback resource corresponding to a first time period, that the wireless node has a scheduled feedback transmission and a scheduled feedback reception on shared frequency resources; selecting one of the scheduled feedback transmission or the scheduled feedback reception based on a rule; and using the feedback resource to perform the selected one of the scheduled feedback transmission or the scheduled feedback reception.

Embodiment 14

The apparatus of Embodiment 13, wherein the scheduled feedback transmission and the scheduled feedback reception each comprises either hybrid automatic repeat request (HARQ) signaling or channel state information (CSI) signaling.

Embodiment 15

The apparatus of Embodiment 13, wherein the rule indicates that the scheduled feedback reception should be selected over the scheduled feedback transmission when scheduled during a same time period.

Embodiment 16

The apparatus of Embodiment 13, wherein the rule indicates to: determine a first priority of the scheduled feedback reception; determine a second priority of the scheduled feedback transmission; and select the one of the scheduled feedback transmission or the scheduled feedback reception based on the first priority and the second priority.

Embodiment 17

The apparatus of Embodiment 16, wherein the rule indicates to select the scheduled feedback reception when the first priority is greater than the second priority, and wherein the rule indicates to select the scheduled feedback transmission when the second priority is greater than the first priority.

Embodiment 18

The apparatus of Embodiment 16, wherein the rule indicates, when the second priority is equal to the first priority, to select between the scheduled feedback transmission and the scheduled feedback reception based on signaling provided to the wireless node.

Embodiment 19

The apparatus of Embodiment 18, wherein the signaling provided to the wireless node indicates to select the scheduled feedback transmission when the second priority is equal to the first priority.

Embodiment 20

The apparatus of Embodiment 18, wherein the signaling provided to the wireless node indicates to select the scheduled feedback reception when the second priority is equal to the first priority.

Embodiment 21

The apparatus of Embodiment 16, wherein the first priority is based on a quality of service (QoS) associated with a packet associated with the scheduled feedback reception, and wherein the second priority is based on a QoS associated with a packet associated with the scheduled feedback transmission.

Embodiment 22

The apparatus of Embodiment 13, wherein the rule indicates that the scheduled feedback reception should be selected over the scheduled feedback transmission if the scheduled feedback reception comprises hybrid automatic repeat request (HARQ) signaling and the scheduled feedback transmission comprises channel state information (CSI) signaling.

Embodiment 23

The apparatus of Embodiment 13, wherein the rule indicates that the scheduled feedback transmission should be selected over the scheduled feedback reception if the scheduled feedback transmission comprises hybrid automatic repeat request (HARQ) signaling and the scheduled feedback reception comprises channel state information (CSI) signaling.

Embodiment 24

The apparatus of Embodiment 13, wherein the rule indicates that the scheduled feedback transmission should be selected over the scheduled feedback reception if the scheduled feedback transmission comprises groupcast signaling and the scheduled feedback reception comprises unicast signaling.

Embodiment 25

A computer readable medium having instructions stored thereon for causing at least one processor to perform a method for wireless communication at a wireless node, the method comprising: determining, for a first feedback resource corresponding to a first time period, that the wireless node has a scheduled feedback transmission and a scheduled feedback reception on shared frequency resources; selecting one of the scheduled feedback transmission or the scheduled feedback reception based on a rule; and using the feedback resource to perform the selected one of the scheduled feedback transmission or the scheduled feedback reception.

Embodiment 26

The computer readable medium of Embodiment 25, wherein the scheduled feedback transmission and the scheduled feedback reception each comprises either hybrid automatic repeat request (HARQ) signaling or channel state information (CSI) signaling.

Embodiment 27

The computer readable medium of Embodiment 25, wherein the rule indicates that the scheduled feedback reception should be selected over the scheduled feedback transmission when scheduled during a same time period.

Embodiment 28

The computer readable medium of Embodiment 25, wherein the rule indicates to: determine a first priority of the scheduled feedback reception; determine a second priority of the scheduled feedback transmission; select the scheduled feedback reception when the first priority is greater than the second priority; and select the scheduled feedback transmission when the second priority is greater than the first priority.

Embodiment 29

The computer readable medium of Embodiment 28, wherein the rule indicates, when the second priority is equal to the first priority, to select between the scheduled feedback transmission and the scheduled feedback reception based on signaling provided to the wireless node.

Embodiment 30

An apparatus for wireless communications by a first user equipment (UE), comprising: means for determining, for a first feedback resource corresponding to a first time period, that the wireless node has a scheduled feedback transmission and a scheduled feedback reception on shared frequency resources; means for selecting one of the scheduled feedback transmission or the scheduled feedback reception based on a rule; and means for using the feedback resource to perform the selected one of the scheduled feedback transmission or the scheduled feedback reception.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, various operations shown in FIG. 5 may be performed by various processors shown in FIG. 2. More particularly, operations 500 may be performed by processors 220, 260, 238, and/or controller/processor 240 of the BS 110 shown in FIG. 2 and/or by one or more of processors 266, 258, 264, and/or controller/processor 280 of the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication at a wireless node, the method comprising:
   determining, for a first feedback resource corresponding to a first time period, that the wireless node has a scheduled feedback transmission and a scheduled feedback reception on shared feedback resources on one or more symbols of a physical channel;
   selecting one of the scheduled feedback transmission or the scheduled feedback reception based on a rule; and
   using the shared feedback resources to perform the selected one of the scheduled feedback transmission or the scheduled feedback reception.

2. The method of claim 1, wherein the scheduled feedback transmission and the scheduled feedback reception each comprises either hybrid automatic repeat request (HARQ) signaling or channel state information (CSI) signaling.

3. The method of claim 1, wherein the rule indicates that the scheduled feedback reception should be selected over the scheduled feedback transmission when scheduled during a same time period.

4. The method of claim 1, wherein the rule indicates to:
   determine a first priority of the scheduled feedback reception;
   determine a second priority of the scheduled feedback transmission; and
   select the one of the scheduled feedback transmission or the scheduled feedback reception based on the first priority and the second priority.

5. The method of claim 4, wherein the rule indicates to select the scheduled feedback reception when the first priority is greater than the second priority, and wherein the rule indicates to select the scheduled feedback transmission when the second priority is greater than the first priority.

6. The method of claim 4, wherein the rule indicates, when the second priority is equal to the first priority, to select between the scheduled feedback transmission and the scheduled feedback reception based on signaling provided to the wireless node.

7. The method of claim 6, wherein the signaling provided to the wireless node indicates to select the scheduled feedback transmission when the second priority is equal to the first priority.

8. The method of claim 6, wherein the signaling provided to the wireless node indicates to select the scheduled feedback reception when the second priority is equal to the first priority.

9. The method of claim 4, wherein the first priority is based on a quality of service (QoS) associated with a packet associated with the scheduled feedback reception, and wherein the second priority is based on a QoS associated with a packet associated with the scheduled feedback transmission.

10. The method of claim 1, wherein the rule indicates that the scheduled feedback reception should be selected over the scheduled feedback transmission if the scheduled feedback reception comprises hybrid automatic repeat request (HARQ) signaling and the scheduled feedback transmission comprises channel state information (CSI) signaling.

11. The method of claim 1, wherein the rule indicates that the scheduled feedback transmission should be selected over the scheduled feedback reception if the scheduled feedback transmission comprises hybrid automatic repeat request (HARQ) signaling and the scheduled feedback reception comprises channel state information (CSI) signaling.

12. The method of claim 1, wherein the rule indicates that the scheduled feedback transmission should be selected over the scheduled feedback reception if the scheduled feedback transmission comprises groupcast signaling and the scheduled feedback reception comprises unicast signaling.

13. An apparatus comprising:
   a memory; and
   a processor coupled to the memory, the memory and processor being configured to:
      determine, for a first feedback resource corresponding to a first time period, that the apparatus has a scheduled feedback transmission and a scheduled feedback reception on one or more symbols of a physical channel;
      select one of the scheduled feedback transmission or the scheduled feedback reception based on a rule; and
      use the shared feedback resources to perform the selected one of the scheduled feedback transmission or the scheduled feedback reception.

14. The apparatus of claim 13, wherein the scheduled feedback transmission and the scheduled feedback reception each comprises either hybrid automatic repeat request (HARQ) signaling or channel state information (CSI) signaling.

15. The apparatus of claim 13, wherein the rule indicates that the scheduled feedback reception should be selected over the scheduled feedback transmission when scheduled during a same time period.

16. The apparatus of claim 13, wherein the rule indicates to:
   determine a first priority of the scheduled feedback reception;
   determine a second priority of the scheduled feedback transmission; and select the one of the scheduled feedback transmission or the scheduled feedback reception based on the first priority and the second priority.

17. The apparatus of claim 16, wherein the rule indicates to select the scheduled feedback reception when the first priority is greater than the second priority, and wherein the rule indicates to select the scheduled feedback transmission when the second priority is greater than the first priority.

18. The apparatus of claim 16, wherein the rule indicates, when the second priority is equal to the first priority, to select between the scheduled feedback transmission and the scheduled feedback reception based on signaling provided to the wireless node.

19. The apparatus of claim 18, wherein the signaling provided to the wireless node indicates to select the scheduled feedback transmission when the second priority is equal to the first priority.

20. The apparatus of claim 18, wherein the signaling provided to the wireless node indicates to select the scheduled feedback reception when the second priority is equal to the first priority.

21. The apparatus of claim 16, wherein the first priority is based on a quality of service (QoS) associated with a packet associated with the scheduled feedback reception, and wherein the second priority is based on a QoS associated with a packet associated with the scheduled feedback transmission.

22. The apparatus of claim 13, wherein the rule indicates that the scheduled feedback reception should be selected over the scheduled feedback transmission if the scheduled feedback reception comprises hybrid automatic repeat request (HARQ) signaling and the scheduled feedback transmission comprises channel state information (CSI) signaling.

23. The apparatus of claim 13, wherein the rule indicates that the scheduled feedback transmission should be selected over the scheduled feedback reception if the scheduled feedback transmission comprises hybrid automatic repeat request (HARQ) signaling and the scheduled feedback reception comprises channel state information (CSI) signaling.

24. The apparatus of claim 13, wherein the rule indicates that the scheduled feedback transmission should be selected over the scheduled feedback reception if the scheduled feedback transmission comprises groupcast signaling and the scheduled feedback reception comprises unicast signaling.

25. A non-transitory computer readable medium having instructions stored thereon that when executed by a wireless node, cause the wireless node to perform a method for wireless communication, the method comprising:
   determining, for a first feedback resource corresponding to a first time period, that the wireless node has a scheduled feedback transmission and a scheduled feedback reception on one or more symbols of a physical channel;
   selecting one of the scheduled feedback transmission or the scheduled feedback reception based on a rule; and
   using the shared feedback resources to perform the selected one of the scheduled feedback transmission or the scheduled feedback reception.

26. The computer readable medium of claim 25, wherein the scheduled feedback transmission and the scheduled feedback reception each comprises either hybrid automatic repeat request (HARQ) signaling or channel state information (CSI) signaling.

27. The computer readable medium of claim 25, wherein the rule indicates that the scheduled feedback reception should be selected over the scheduled feedback transmission when scheduled during a same time period.

28. The computer readable medium of claim 25, wherein the rule indicates to:
   determine a first priority of the scheduled feedback reception;
   determine a second priority of the scheduled feedback transmission;
   select the scheduled feedback reception when the first priority is greater than the second priority; and
   select the scheduled feedback transmission when the second priority is greater than the first priority.

29. The computer readable medium of claim 28, wherein the rule indicates, when the second priority is equal to the first priority, to select between the scheduled feedback transmission and the scheduled feedback reception based on signaling provided to the wireless node.

30. An apparatus for wireless communications, comprising:
   means for determining, for a first feedback resource corresponding to a first time period, that the apparatus has a scheduled feedback transmission and a scheduled feedback reception on one or more symbols of a physical channel;
   means for selecting one of the scheduled feedback transmission or the scheduled feedback reception based on a rule; and
   means for using the shared feedback resources to perform the selected one of the scheduled feedback transmission or the scheduled feedback reception.

* * * * *